Inventors
Sydney Jacobson
Denis Knowles
Derek Parker
By Cushman, Darby & Cushman
Attorneys

# United States Patent Office 3,674,592
Patented July 4, 1972

1

3,674,592
METHOD OF BONDING AN INTERLINING TO A GARMENT USING STRAY FIELD DIELECTRIC HEATING
Sydney Jacobson, Woodlands, Oakdale, Harrogate, Denis Knowles, Barwick-in-Elmet, near Leeds, and Derek Parker, Farsley, Pudsey, England, assignors to Montague Burton Limited, Leeds, England
Filed May 13, 1969, Ser. No. 824,184
Claims priority, application Great Britain, May 20, 1968, 23,909/68
Int. Cl. H05b 9/00
U.S. Cl. 156—274     7 Claims

ABSTRACT OF THE DISCLOSURE

In the manufacture of garment parts the interlining is bonded to the top cloth by pressing the two components together and exposing heat-activated material associated with one or both components to the action of an electric current of frequency at least one megacycle per second.

---

Figure 1:
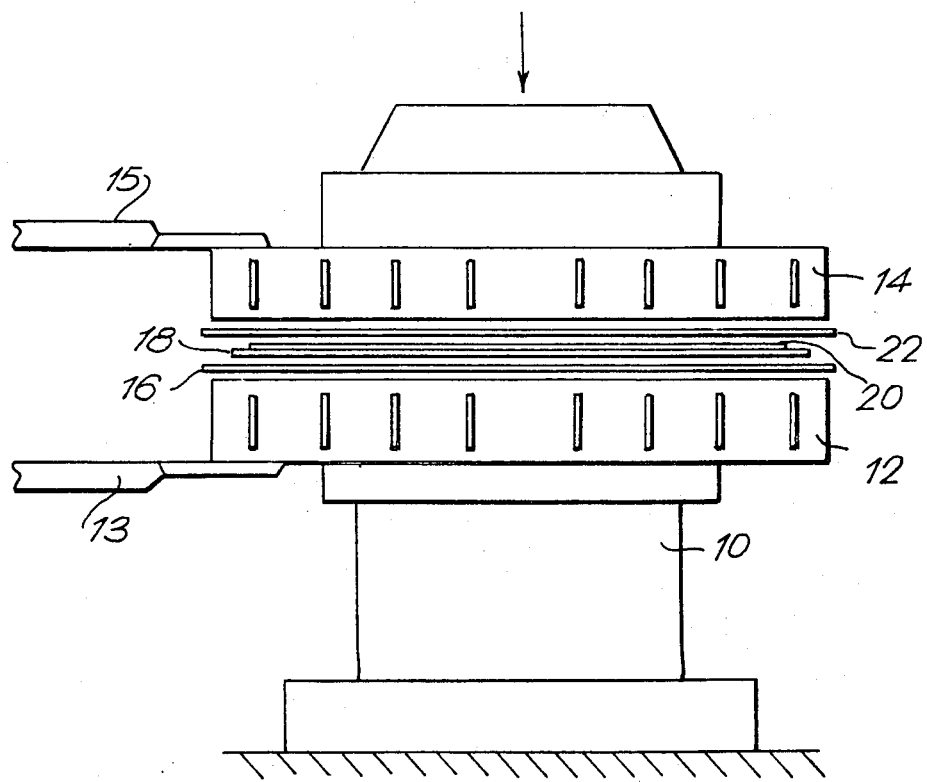

This invention relates to garments and especially to garments having means of reinforcing or supporting parts of them. The invention is more especially concerned with the manufacture of individual parts for a garment, for example the forepart or collar of a coat, which are reinforced or supported in a manner such that the style features thereof and the mechanical requirements of fit and function are provided for.

Hitherto the reinforcement or support of certain parts of the garment has been generally effected by forming a separate component of conventional construction, known as an "interlining" or "canvas" and inserting this "interlining" between the inner lining of the garment and the outer, or top, cloth. The interlining may be made of, for example, stiffened fabric, felt, wadding, nonwoven fabric, plastics or a combination of these, and may be retained in position by stitching, or by causing it to adhere to the outer cloth. For example, the interlining may be caused to adhere to the outer cloth by means of a heat activated thermoplastic adhesive, heat energy being applied by means of high temperature platens mechanically forced together so that the heat is allowed to conduct its way through the fabric till the adhesive becomes plastic, at which stage a bond or fusion will take place.

This system is fraught with difficulties. The problems of accurately maintaining flat platen surfaces at elevated temperatures often result in poor contact areas on the platens and consequently lack of adhesion; this, coupled with the problems associated with colour fastness of the outer cloth at temperatures in excess of 150° C., has caused serious considerations to be applied in seach of alternative methods, and it is an object of the present invention to provide a method of bonding an interlining to an outer or top cloth which does not suffer from these disadvantages, and which is simple to carry out and also very quick.

According to the present invention a method of bonding an interlining to an outer or top cloth comprises pressing the interlining and the cloth together and exposing heat-activated material associated with the interlining and/or cloth to the action of an electric current of frequency at least 1 megacycle per second.

The effect of the high frequency current will be to generate sufficient heat in the heat-activated material, by friction between the molecules, to soften or melt the material and consequently bring about adhesion between the interlining and the top cloth.

The heat-activated material may be a thermoplastic or a thermosetting material, and may be present in the interlining in the form of discrete particles distributed throughout the body of the interlining or on the surface thereof. Alternatively it may be present as a surface coating of the interlining. It may, of course, be present in the body of, or on the surface of, the top cloth, but normally it will be associated with the interlining, for appearance considerations. If desired, however, it could simply be a layer disposed between the interlining and the top cloth. Suitable heat-activated materials include polyvinyl chloride, polyesters, polyamides, polyester-polyurethane interpolymers, polyether polyurethane interpolymers, butadiene polymers and copolymers, polyacrylates, polyolefines such as polyethylene and ethylene copolymers.

The choice of heat-activated material for use in any particular case will depend on a number of factors. Thus, the material used should respond sufficiently to bring about the necessary adhesion at a temperature below that at which the materials of the top cloth and the interlining are impaired. Furthermore, the heat-activated material should be one which does not adversely affect the dyestuff in the top cloth. Again, the heat-activated material should be chemically resistant to dry cleaning solvents such as perchloroethylene, trichloroethylene, white spirits and petrol.

The interlining itself will normally be composed, as is conventional, of stiffened fabric, felt, wadding, non-woven fabric or a combination of any two or more of these; the heat-activated material being associated with it as described above. If desired, however, the interlining may be composed wholly of heat-activated material. The interlining may be a separate member or it may be formed in situ, e.g. by depositing interlining forming ingredients onto the inside surface of the top cloth and consolidating them thereon.

The garment parts formed in accordance with the present invention may be made individually, in batches, or continuously. When they are to be made individually or in batches, the top cloths and interlinings are first of all cut to shape, after which they are superposed one on the other and bonded together. In a continuous operation, however, lengths of top cloth material may firstly be bonded to lengths of interlining material, the desired garment parts subsequently being cut from the laminated material so formed.

An apparatus suitable for forming garment parts individually or in batches comprises two vertically separable flat platens coupled to a high frequency, e.g. an R.F., generator. The platens may include a cooling system. When making an individual part, the top cloth is placed on the lower platen, outer surface down. The interlining, containing heat-activated material, is placed on top of the top cloth, and the upper platen is lowered to press the interlining into the overall contact with the top cloth.

The generator is then switched on and the heat-activated material is dielectrically heated such that it softens or melts (if thermoplastic) or cures (if thermosetting) sufficiently to bond the interlining to the top cloth. A similar apparatus may be used for making a number of garment parts simultaneously. This may be done by superimposing a plurality of sets of outer cloth/interlining material components in the press, with a separating sheet between each adjacent pair of outer cloth/interlining sets. Thus, for example, the two foreparts of a garment may be formed simultaneously by placing a separating sheet on the surface of the lower platen, superimposing the outer cloth of one of the foreparts and the interlining on the separating sheet, which may for example be a glass cloth coated with polytetrafluoroethylene, placing a second separating sheet over the interlining, superimposing the interlining and outer cloth of the other forepart on the separating sheet so as exactly to cover the first outer cloth and interlining, placing a third separating sheet on the second outer cloth, and then pressing the assembly together with heating by an R.F. current. The platens are then separated and the two formed foreparts removed.

Alternatively to the intermittent or batch method described above, garment parts may be produced in a continuous manner by passing successive "sandwiches" of outer cloth and interlining through a high frequency field, the components of the sandwich being pressed together during passage through the H.F. field. Preferably the continuous method is carried out using a stray field radio frequency platen, which comprises a number of rod-like electrodes extending parallel to each other, alternate electrodes being coupled together. For best results the platen is convex in the longitudinal direction, this allowing more intimate and uniform contact between the interlining and the top cloth.

The heating necessary to activate the bonding material sufficiently for it to cause adhesion between the interlining and the top cloth is provided by an alternating electric potential of frequency at least one megacycle per second. Thus, frequencies in the high frequency, radio frequency and microwave frequency range may be utilised. In practice, frequencies in the range 2 to 180 megacycles per second have been found most suitable for the effective bonding of garment part components, and with these frequencies bonding may be accomplished in 3 seconds or less.

Figure 2:
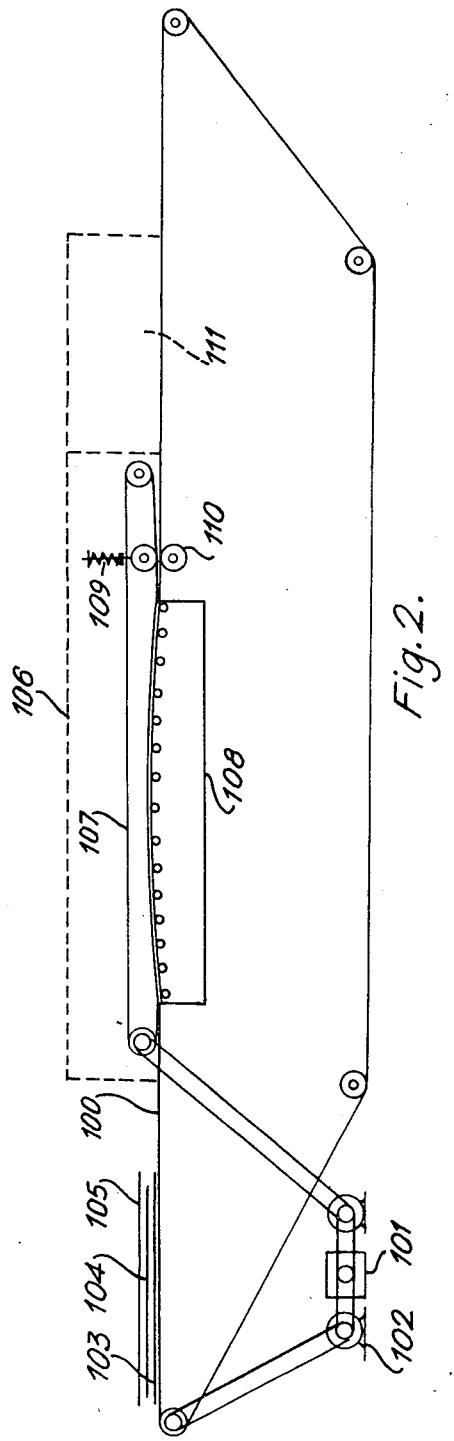

In the accompanying drawings, given for the purpose of illustrating the invention, FIG. 1 is an exploded diagrammatic sectional view of an apparatus for carrying out the invention in connection with the manufacture of individual garment parts or with the simultaneous manufacture of a plurality of such parts; and FIG. 2 is a diagrammatic elevation of apparatus for the continuous manufacture of garment parts.

The apparatus shown in FIG. 1 comprises a frame 10 mounted on which is a lower platen/electrode 12. Also mounted on frame 10 is an upper platen/electrode 14 which is capable of vertical movement relative to lower platen 12. The platens 12, 14 are coupled by leads 13, 15 respectively to an R.F. generator and are water-cooled. The platens are shown apart for clarity.

In operation the platens are separated and an adhesion-resistant or separating sheet 16 is placed on the surface of the lower platen. Then the outer cloth 18 and interlining 20 containing heat-activated material, e.g. polyethylene or polyvinyl chloride, are superimposed on the separating sheet, another separating sheet 22 is placed on the interlining, and the upper platen 14 is lowered to press the assembly together. The current is switched on and, after a few seconds, the press is opened to reveal an interlining/top cloth bonded structure.

In a typical case, platens of surface dimensions 48" x 36" and using a 15 kg. generator giving a frequency of 52 megacycles/sec. required 3 seconds to bond an interlining comprising a loosely woven surface coated material having a cotton warp and a rayon-hair weft to a standard worsted material.

The apparatus shown in FIG. 2 consists essentially of an endless transporter belt 100, driven by a motor 101 and variable drive unit 102. The outer cloth 103 is placed face down onto the belt 100, and the interlining 104 is placed onto cloth 103 with the adhesive side of the interlining face down towards the cloth. The cloth and interlining are covered by a protective film or membrane 105. The sandwich of components 103, 104 and 105 is propelled towards a stray field R.F. platen 108 situated under an R.F. safety shield 106.

Immediately it enters the R.F. area the sandwich is subjected to light mechanical pressure by means of a top belt 107 the lower pass of which cooperates with the R.F. platen 108, the platen being convex in the longitudinal direction to assist in pressing the components together. As the sandwich proceeds over the platen R.F. energy is absorbed by the adhesive, which in turn is caused to become molten or plastic by the time the sandwich reaches a spring-loaded soft rubber nip roller 109. At this stage the top belt 107, protective film 105, interlining 104, outer cloth 103 and transporter belt 100 are subjected to a mechanical pressure, between roller 109 and a steel roller 110, sufficient to cause a transposition of the adhesive from the interlining to the outer cloth and to bond these two components together.

After passing through the nip roller the composite fabric, with film 105, enters a cooling zone 111. This may be provided by a cold air blast, vacuum extraction or, if necessary, by refrigeration. The completed garment part, after removal of the protective film, then passes to the inspection and removal area ready for the next manufacturing sequence.

Whilst the principle described previously is intended primarily for the mass production of bonded men's outerwear jacket and coats, it is none the less effective in the bonding of piece goods, i.e. for combining the materials melton and hessian canvas for use in garments as undercollars. By this process entire 70 yard pieces may be laminated on a continuous production system.

What we claim is:

1. A continuous method for bonding the interlining of a garment part to the top cloth thereof, comprising disposing an assembly comprising said interlining and said top cloth in face-to-face contact on a continuously moving endless transporter belt, a heat-activated dielectric material being associated with one of said interlining and said top cloth, passing said assembly on said belt through the field of a stray field radio frequency platen, operating at a frequency of at least 1 megacycle per second, which platen is curved longitudinally of the direction of movement of said belt, thereby heating the dielectric material by the electric current field to a temperature at which it becomes adhesive, while maintaining said interlining in intimate overall contact with said top cloth, removing said assembly from the influence of said field and pressing the top cloth onto said interlining with sufficient pressure to cause transposition of the adhesive of the interlining to the top cloth and to cause bonding to occur therebetween.

2. A method as claimed in claim 1 wherein the heat-activated material is distributed in the form of discrete particles throughout the body of the interlining.

3. A method as claimed in claim 1 wherein the interlining is composed wholly of heat-activated material.

4. A method as claimed in claim 1 wherein the electric current is a radio frequency current.

5. A method as claimed in claim 4 wherein the frequency of the current is in the range 2 to 180 megacycles per second.

6. A method as claimed in claim 1 wherein a plurality of garment parts are formed simultaneously.

7. A method as claimed in claim 1 wherein the heat-activated material is distributed in the form of discrete particles over the surface of said interlining in contact with said top cloth.

References Cited

UNITED STATES PATENTS

| | | | |
|---|---|---|---|
| 2,732,324 | 1/1956 | Morris | 156—283 |
| 3,264,155 | 8/1966 | Rhee | 156—273 |
| 3,150,024 | 9/1964 | Penman | 156—283 |
| 3,239,399 | 3/1966 | King | 156—272 |
| 3,345,226 | 10/1967 | Frenkel et al. | 156—273 |
| 3,393,119 | 7/1968 | Dugan | 156—273 |
| 3,449,184 | 6/1969 | Balk | 156—289 |
| 2,610,384 | 9/1952 | Mann et al. | 156—272 |
| 3,162,561 | 12/1964 | Farkas | 156—274 |

FOREIGN PATENTS 1,087,560  10/1967  Great Britain.

EARL D. QUARFORTH, Primary Examiner

E. E. LEHMANN, Assistant Examiner

U.S. Cl. X.R.

156—283, 289